Oct. 7, 1930.    M. GROHEK    1,777,611

PRESSURE CONTROLLED VALVE

Filed May 15, 1928

Inventor

M. Grohek

By *Clarence A. O'Brien*
Attorney

Patented Oct. 7, 1930

1,777,611

UNITED STATES PATENT OFFICE

MATT GROHEK, OF SUPERIOR, WISCONSIN

PRESSURE-CONTROLLED VALVE

Application filed May 15, 1928. Serial No. 277,858.

The present invention relates to improvements in valves and has reference more particularly to one wherein the valve plug is normally maintained in a seated or closed position under the action of a fluid under pressure, said valve being moved to an open position when the fluid in the valve body overcomes the pressure that maintains the valve in a closed position.

Another important object of the invention is to provide a pressure controlled valve of the above mentioned character, which will, at all times, be positive and efficient in its operation, the same being further simple in its construction, inexpensive, strong and durable, and further well adapted to the purpose for which it is designed.

Other objects of the invention will become apparent as the nature of the invention proceeds and when taken in connection with the accompanying drawing.

In the accompanying drawing, forming a part of this application and wherein like reference characters designate like parts throughout the several views.

Figure 1:
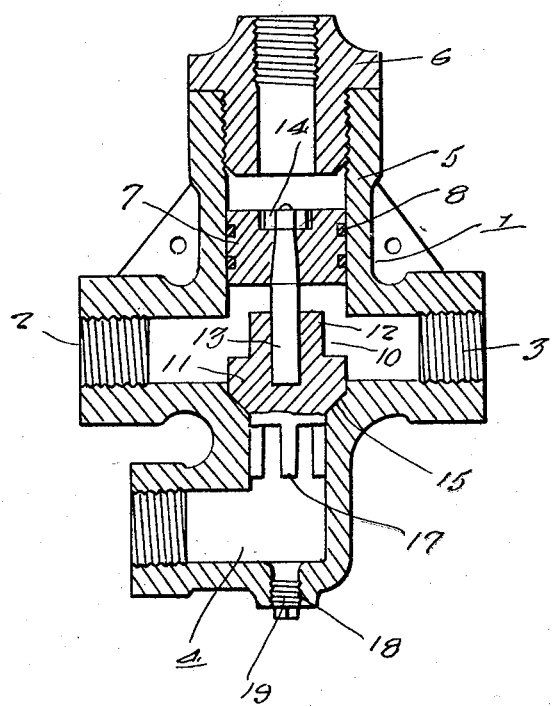
Figure 1 is a vertical sectional view through the pressure controlled valve embodying my invention, showing the valve in its normally closed position.
Figure 2:
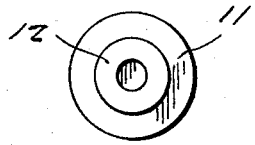
Figure 2 is a top plan view of the valve per se.
Figure 3:
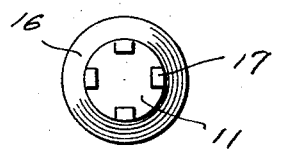
Figure 3 is a bottom plan view thereof.

In the drawing, wherein for the purpose of illustration is shown the preferred embodiment of my invention, the numeral 1 designates the valve body that is formed with a pair of opposed and aligned outlet passages 2 and 3 respectively in the intermediate portion thereof, the same being arranged horizontally. An angular fluid inlet nipple 4 is arranged on the bottom of the valve body while extending upwardly from the central portion of the valve body is the cylinder 5, the upper end of which is internally threaded for receiving a fitting 6.

Figure 4:
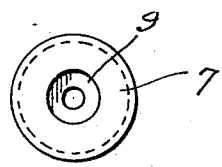
Figure 4 is a top plan view of the piston.

This fitting is adapted for connection with an exhaust pipe (not shown) leading for example from a water heater pump whereby the exhaust pressure will enter the cylinder to normally maintain the piston 7 which is operable within the cylinder in its lowermost position for a purpose to be presently described. This piston is provided with packing rings 8 in its outer peripheral face for engagement with the inner wall of the cylinder to prevent leakage. Furthermore, the piston is formed with a central bore that is slightly tapered and the upper end of the bore communicates with an enlarged cavity 9, as shown very clearly in Figures 1 and 4 of the drawings.

Operable in the valve chamber 10 formed in the central portion of the valve body 1, and which chamber communicates with the aligned discharge passages 2 and 3, as well as with the angular inlet nipple 4 and the cylinder 5, is the valve unit 11, and this valve is formed in its upper face with a recess that communicates with the bore of the tubular extension 12 formed on the top of the valve for receiving, in a slidable manner, the lower end of the piston rod 13. The upper end of this piston rod is tapered and extends through the tapered bore formed in the piston 7 and the upper extremity of this piston rod is threaded to receive the nut 14 that is disposed within the cavity 9, as clearly shown in Figure 1.

The bottom of the chamber 10 is formed with a conical valve seat 15, which cooperates with the bevelled face 16 of the valve 11, and depending from the bottom face of this valve are the spaced elongated prongs or guide fingers 17 that are disposed in the vertical portion of the angular inlet nipple 4.

The inlet nipple 4 is adapted to be connected to any suitable water supply. A drain opening 18 is provided in the inlet nipple 4 and a suitable plug 19 normally keeps this drain opening closed.

The oppositely disposed outlet passages 2 and 3 are adapted for connection to a water heater or other device to be supplied with the fluid from the inlet 4, and if desired a plug may be inserted in either one of the outlet ports, so that the fluid will be discharged through only one of the outlet passages.

Normally, the exhaust pressure that enters the cylinder 5 will force the piston 7 downwardly whereby to maintain the valve 11 in a seated position to cut off communication between the inlet nipple and the outlet passages.

However, when the pressure of the fluid entering the inlet nipple 4 overcomes the pressure in the cylinder 5, the piston and the valve will be raised so that the fluid entering the valve body will pass from the inlet nipple into the chamber 10 and from there will be discharged through either one or both of the discharge passages.

As soon as the pressure of the inflowing fluid drops, the pressure of the exhaust in the cylinder will automatically move the valve to a closed position.

It will thus be seen from the foregoing description that I have provided a pressure control valve which will, at all times, be positive and efficient in its operation, and due to its simplicity, the parts can be readily and easily assembled or disassembled whenever necessary.

While I have shown the preferred embodiment of my invention, it is to be understood that various changes in the size, shape and arrangement of parts may be resorted to, without departing from the spirit of the invention or the scope of the appended claims.

Having thus described my invention, what I claim as new is:

1. In a pressure controlled valve, a valve body formed of a central chamber and having an outlet passage extending from the side thereof, and into communication with the chamber, an inlet nipple at the bottom of the body in communication with the chamber, a cylinder extending from the top of the body in communication with said chamber, said body at the inner end of said inlet nipple being provided with a conical valve seat, a valve operable in the chamber and having a lower frusto-conical portion fitting conformably within said valve seat, a tubular extension formed on the top of said valve having a vertical bore opening at the upper end of said tubular extension, a piston adapted for reciprocation within said cylinder, said piston at its top being provided with a cavity, and having a vertical bore extending therethrough in communication at one end with said cavity, the bore of said piston being in longitudinal alignment with the bore of said tubular valve extension, a piston rod operatively connecting the piston with said valve, said piston rod having a tapered upper end extending through the bore of said piston, a retaining nut upon the upper end of said piston rod seated within said cavity, and the lower end portion of said piston rod being adapted for slidable reception within the bore of said tubular valve extension.

2. In a pressure controlled valve, a valve body formed of a central chamber and having an outlet passage extending from the side thereof, and into communication with the chamber, an inlet nipple at the bottom of the body in communication with the chamber, a cylinder extending from the top of the body in communication with said chamber, said body at the inner end of said inlet nipple being provided with a conical valve seat, a valve operable in the chamber and having a lower frusto-conical portion fitting conformably within said valve seat, a tubular extension formed on the top of said valve having a vertical bore opening at the upper end of said tubular extension, a piston adapted for reciprocation within said cylinder, said piston at its top being provided with a cavity, and having a vertical bore extending therethrough in communication at one end with said cavity, the bore of said piston being in longitudinal alignment with the bore of said tubular valve extension, a piston rod operatively connecting the piston with said valve, said piston rod having a tapered upper end extending through the bore of said piston, a retaining nut upon the upper end of said piston rod seated within said cavity, and the lower end portion of said piston rod being adapted for slidable reception within the bore of said tubular valve extension, said valve being moved to an open position by fluid entering the chamber through said inlet nipple at a greater pressure than that in the cylinder, and a plurality of guide fingers depending from the bottom of the valve for engagement with the inner wall of the inlet nipple.

In testimony whereof I affix my signature.

MATT GROHEK.